(12) United States Patent
Ranon

(10) Patent No.: US 6,492,903 B1
(45) Date of Patent: Dec. 10, 2002

(54) MULTIPLE INPUT-TYPE AND MULTIPLE SIGNAL PROCESSING-TYPE DEVICE AND RELATED METHODS

(75) Inventor: Peter M. Ranon, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/998,703

(22) Filed: Nov. 30, 2001

(51) Int. Cl.[7] .................................................. G08B 19/00
(52) U.S. Cl. ........................ 340/521; 340/523; 340/533; 340/517; 340/531; 340/538; 340/534
(58) Field of Search .................................. 340/521, 523, 340/517, 531, 533, 534, 538

(56) References Cited

U.S. PATENT DOCUMENTS

| | | | |
|---|---|---|---|
| 4,368,460 A | 1/1983 | Clinard et al. | 340/522 |
| 4,811,308 A | 3/1989 | Michel | 367/136 |
| 4,944,036 A | 7/1990 | Hyatt | 367/43 |
| 5,422,626 A * | 6/1995 | Fish | 340/539 |
| 5,469,150 A * | 11/1995 | Sitte | 340/3.42 |
| 6,317,034 B1 * | 11/2001 | Issa et al. | 340/426 |
| 6,339,372 B1 * | 1/2002 | Warnock et al. | 340/531 |
| 6,369,706 B1 * | 4/2002 | Anderson et al. | 340/521 |

* cited by examiner

Primary Examiner—Daryl Pope
(74) Attorney, Agent, or Firm—Allen, Dyer, Doppelt, Milbrath & Gilchrist, P.A.

(57) ABSTRACT

A multiple input-type and multiple signal processing-type device may include an input stage for receiving a plurality of different analog signal types, and down and up-converters for respectively downwardly converting first signal types and upwardly converting second signal types to a desired processing frequency range. Furthermore, the device may include an analog-to-digital converter (ADC) for converting analog signals at the desired processing frequency range into digital signals, and time and frequency domain signal processing sections connected to the ADC for processing the digital signals. Furthermore, the device may advantageously include a user selector input for permitting a user to selectively activate one of the down-converter or up-converter and one of the time or frequency domain signal processing sections. Additionally, a signal recognition processor may be included for performing signal recognition to determine whether to selectively activate the down-converter or up-converter and the time domain or frequency domain signal processing sections.

40 Claims, 6 Drawing Sheets

MULTIPLE INPUT-TYPE AND MULTIPLE SIGNAL PROCESSING-TYPE DEVICE AND RELATED METHODS

FIELD OF THE INVENTION

The present invention relates to the field of electronic devices, and more particularly, to electronic signal processors and related methods.

BACKGROUND OF THE INVENTION

Signal processing systems are commonly used in a wide variety of applications. For example, many electronic devices use signal processors to detect and interpret various input signals, such as from a remote control, and provide an appropriate response based upon the signals. Signal processors may also be used to interpret radio frequency (RF) signals from a radar antenna to detect the location of aircraft, for example. Another example may include using a signal processor to interpret vibration signals from a seismometer or geophone to determine the location of various geological strata and formations in seismic exploration, for example.

An example of a signal processing system for detecting moving targets is disclosed in U.S. Pat. No. 4,368,460 to Clinard et al. entitled "Dual Mode Moving Target Sensor." This patent discloses a dual mode sensor having a seismic channel and an RF channel with a logic circuit for recognizing both channels. The seismic channel detects disturbances with a geophone and determines spacing and impulse density. The RF channel radiates electromagnetic energy and detects impedance changes in an oscillator circuit driving the antenna when the target is in the vicinity.

U.S. Pat. No. 4,944,036 to Hyatt entitled "Signature Filter System" discloses a filtering system for acquiring and processing signals using a sampled filter for signal separation and signal enhancement. For example, the filtering system may be configured for use with geophones when used in a geophysical application, hydrophones when used in sonar applications, and radar receivers, such as phased array antennas, for radar applications.

One potential drawback of such prior art devices is that they may not accommodate enough signal types to provide a complete interpretation in a given environment. For example, it may be necessary in some applications to processes acoustic and/or optical signals to correctly detect a moving target, which would not otherwise be possible with the target sensor disclosed in the Clinard et al. patent. Also, while the filter system disclosed in the Hyatt patent may be configured to process different signal types, this patent does not provide a way to combine such functionality within a single device. Thus, it may be cumbersome as well as expensive to use multiple prior art devices to provide adequate signal processing capabilities for certain applications.

SUMMARY OF THE INVENTION

In view of the foregoing background, it is therefore an object of the invention to provide a multiple input-type and multiple signal processing-type device and related methods.

This and other objects, features, and advantages in accordance with the present invention are provided by a multiple input-type and multiple signal processing-type device including an input stage for receiving a plurality of different analog signal types, a down-converter for downwardly converting first signal types to a desired processing frequency range, and an up-converter for upwardly converting second signal types to the desired processing frequency range. Furthermore, the device may include an analog-to-digital converter (ADC) for converting analog signals at the desired processing frequency range into digital signals, a time domain signal processing section connected to the ADC for performing time domain signal processing on the digital signals, and a frequency domain signal processing section connected to the ADC for performing frequency domain signal processing on the digital signals. A digital down converter (DDC) for special processing may also be included upstream from the time and/or frequency domain signal processing sections.

More particularly, the device may advantageously include a user selector input for permitting a user to selectively activate one of the down-converter or up-converter, and to selectively activate one of the time domain or frequency domain signal processing sections. Additionally, a signal recognition processor may be included for performing signal recognition to determine whether to selectively activate the down-converter or up-converter, and to determine whether to selectively activate the time domain or frequency domain signal processing sections.

The time domain signal processing section may include a convolution module for performing pattern recognition on the digital signals and/or a pulse threshold crossing module for performing waveform detection on the digital signals. Further, the frequency domain signal processing section may include a convolution module for performing pattern recognition on the digital signals and/or a spectral threshold crossing module for performing waveform detection on the digital signals.

Moreover, the spectral threshold crossing module may include a constant false alarm rate (CFAR) module, a magnitude calculation module upstream from the CFAR module, and a DC term or interference signal elimination module upstream from the magnitude calculation module. The spectral threshold crossing module may also include at least one of a fast Fourier transform (FFT) module and an inverse FFT (IFFT) module.

Additionally, the multiple input-type and multiple signal processing-type device may include at least one filter coupling the analog signals at the desired processing frequency to the ADC. Also, the plurality of signal types may include at least two of optical signals, radio frequency (RF) signals, seismic signals, and acoustic signals.

A method aspect of the invention is for processing multiple signals having different signal types and may include providing a multiple input-type and multiple signal processing-type device as described above. The method may further include configuring the multiple input-type and multiple signal processing-type device to permit a user to selectively activate one of the down-converter or up-converter, and configuring the multiple input-type and multiple signal processing-type device to permit the user to selectively activate one of the time domain or frequency domain signal processing sections.

Another method aspect of the invention is for processing multiple signals having different signal types and may include providing a multiple input-type and multiple signal processing-type device as described above. The method may further include using a signal recognition processor to perform signal recognition to determine whether to selectively activate the down-converter or up-converter, and to determine whether to selectively activate the time domain or frequency domain signal processing sections.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
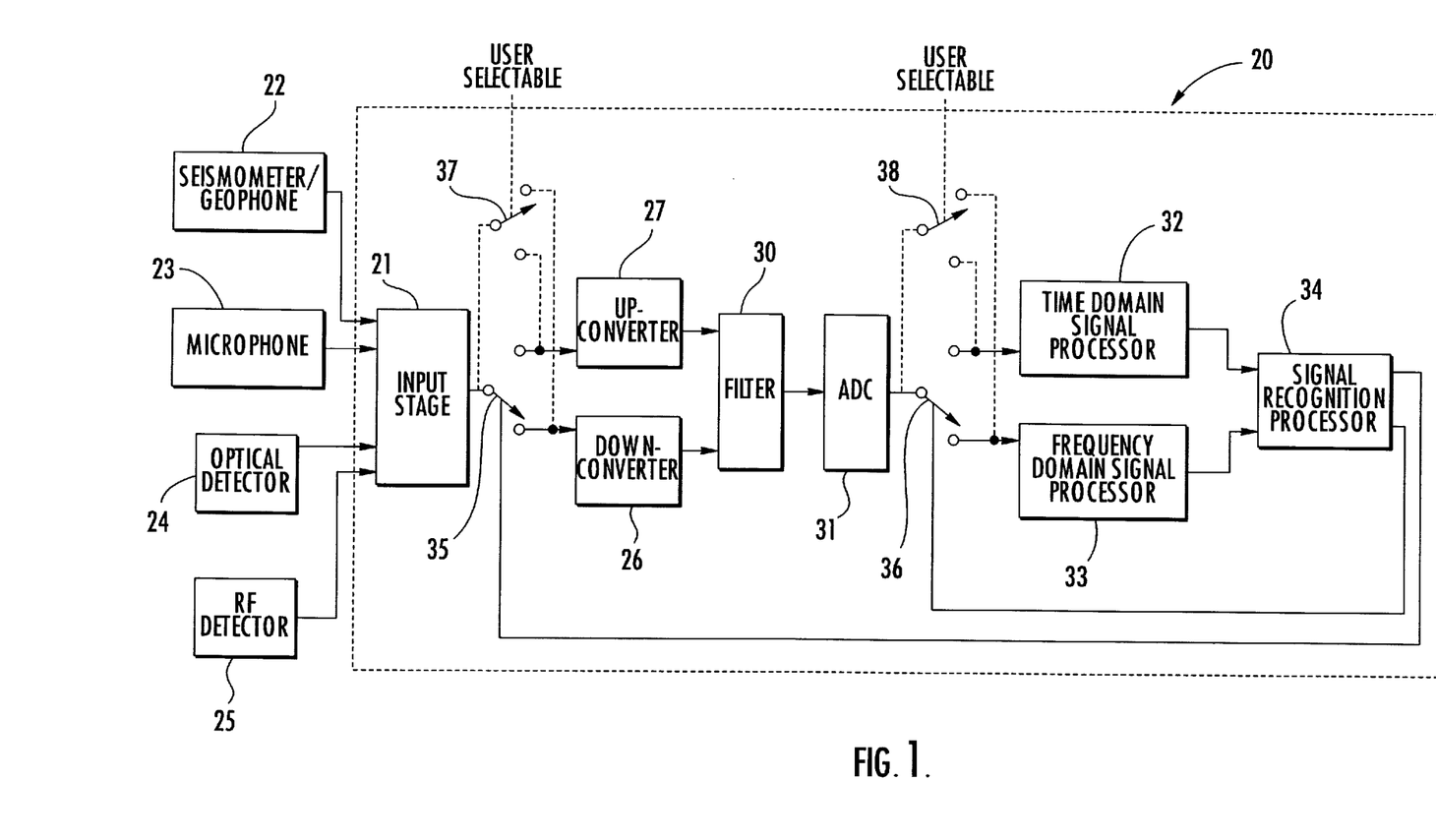
FIG. 1 is schematic block diagram of a multiple input-type and multiple signal processing-type device according to the present invention.

Referring initially to FIG. 1, a multiple input-type and multiple signal processing-type device 20 according to the invention will now be described. The multiple signal processing-type device 20 includes an input stage 21 for receiving a plurality of different analog signal types. By way of example, the input stage 21 may include the appropriate connectors and circuitry for receiving signals such as seismic signals from a seismometer or geophone 22, acoustic signals from a microphone 23, optical signals from an optical sensor 24, and/or RF signals from an RF sensor 25 (e.g., antenna). The optical sensor 24 may be a CCD or spectral photometer, and the RF sensor 25 may be an antenna such as a phased array antenna, for example. Other signal detectors and types may be used in accordance with the present invention as well, as will be understood by those of skill in the art based upon the disclosure herein.

It will be understood by those of skill in the art that each of the various detection devices listed above typically detects signals over a particular operating range. For example, the seismometer/geophone 22 may be responsive to seismic signals in a range of frequencies up to about a few hundred Hz, whereas the RF sensor 25 may detect signals of tens of Hz to several GHz or more. Thus, to conveniently allow for use with these varying signal detectors, the multiple signal processing-type device 20 of the present invention advantageously includes a down-converter 26 for downwardly converting first signal types to a desired processing frequency range, and an up-converter 27 for upwardly converting second signal types to the desired processing frequency range.

More specifically, the down-converter 26 and the up-converter 27 are used to convert the various signal types to an intermediate frequency (IF) that allows for ready processing of the signals. For example, the first signal types may be the signals from the optical sensor 24 and the RF sensor 25, which are thus routed to the down-converter 26 to be downwardly converted to the desired processing IF range. Similarly, the second signal types may be those from the seismometer/geophone 22 and microphone 23, which require upward conversion to the desired processing IF range and are thus routed to the up-converter 27. By way of example, the IF frequency range may be from about DC to 320 MHz, though other frequencies may also be used.

The multiple input-type and multiple signal processing-type device 20 may further include at least one filter 30 coupling the analog signals at the desired processing frequency to an analog-to-digital converter (ADC) 31. The filter may include a variable gain amplifier section connected to a low pass filter, for example, although other configurations known to those of skill in the art are also within the scope of the present invention. Furthermore, more than one gain section may be used, if desired. The ADC 31 converts the analog signals at the desired processing frequency range into digital signals, as will be appreciated by those of skill in the art. Of course, if digital signals are provided to the device 20 which do not require up/down or analog-to-digital conversion, these signals may be directly input to the time and/or frequency domain signal processors 32, 33.

According to the present invention, a time domain signal processing section 32 is connected to the ADC 31 for performing time domain signal processing on the digital signals, and a frequency domain signal processing section 33 is connected to the ADC for performing frequency domain signal processing on the digital signals, both of which will be described further below.

It will be appreciated that some degree of tuning of the input analog signals is performed in the down-converter 26 and up-converter 27. Additional signal tuning may be performed by coupling a digital receiver (not shown) between the ADC 31 and time domain and frequency domain signal processing sections 32, 33. As a result, a relatively fine degree of tuning may be possible according to the present invention, allowing substantially the same amount of bandwidth to be processed as is present on the input signal. Further, in some embodiments a digital down converter (DDC) (not shown) may also be included upstream from the time domain signal processing section 32 and/or the frequency domain signal processing section 33 for spectral processing, as will be understood by those of skill in the art.

Additionally, a signal recognition processor 34 may optionally be included for performing signal recognition to determine whether to selectively activate the down-converter 26 or up-converter 27, as illustratively shown by a switch 35. Furthermore, the signal recognition processor 34 may also be used to determine whether to selectively activate the time domain or frequency domain signal processing sections 32, 33, again illustratively shown with a switch 36.

The signal recognition processor 34 may be used to determine which of the detectors 22–25 is receiving the strongest signal, etc. and cause switching to either the down converter 26 or up-converter 27 accordingly. Further, the signal recognition processor 34 may switch between the time domain and frequency domain signal processor sections 32, 33 based upon processing time, the particular type of input being processed, etc.

Furthermore, in addition to, or in conjunction with, the signal recognition processor 34, one or more user selector inputs (illustratively shown as switches 37, 38) may be optionally used for respectively permitting a user to selectively activate one of the down-converter 26 or up-converter 27, and to selectively activate one of the time domain or frequency domain signal processing sections 32, 33. This feature may be particularly advantageous if a user wants to use only a single input detector for a given application, or only wishes to perform processing in the time domain or the frequency domain.

Figures 2, 3:
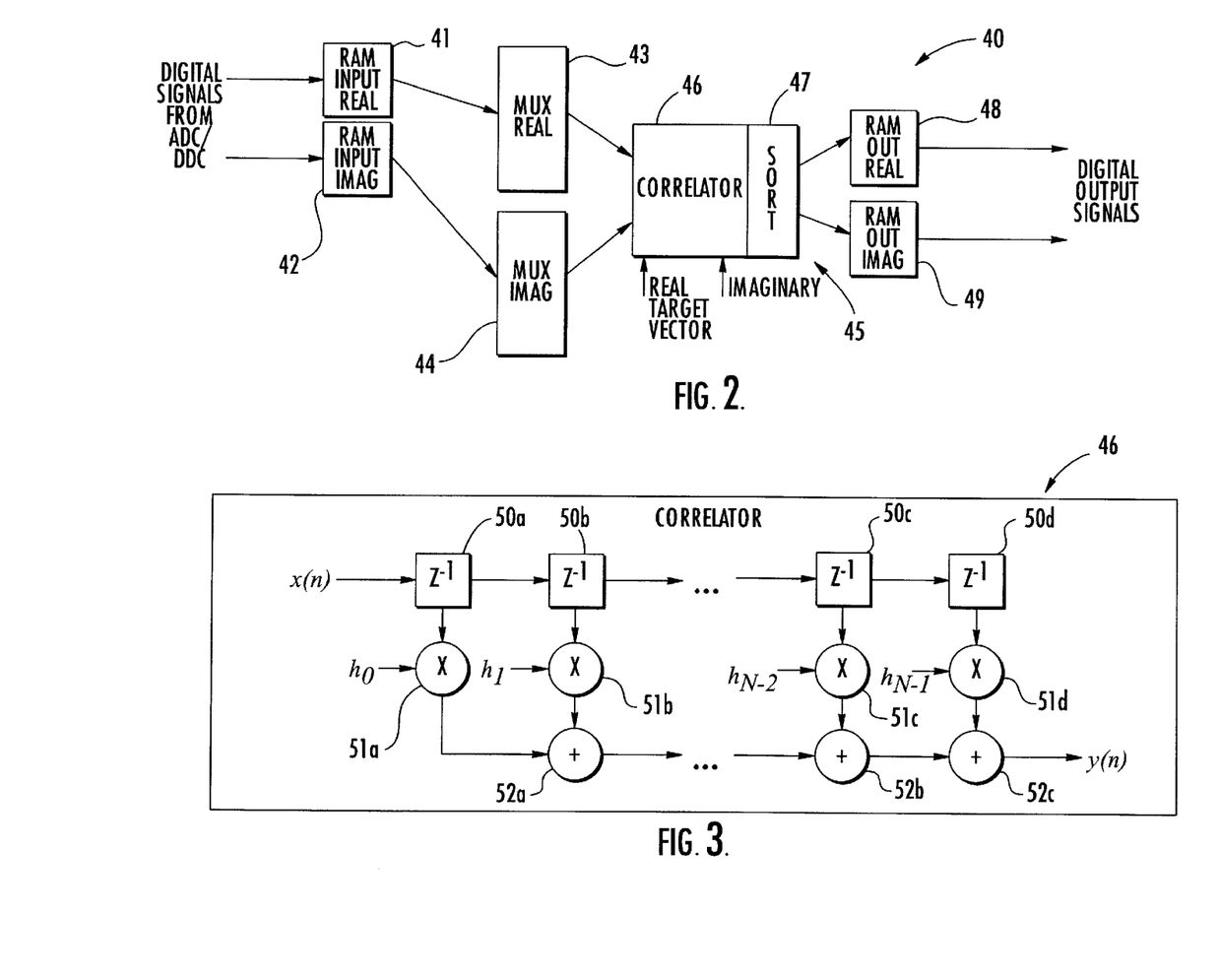
FIG. 2 is a more detailed schematic block diagram illustrating one embodiment of the time domain signal processor of FIG. 1 including a convolution module.
FIG. 3 is a more detailed schematic block diagram of the convolution module of FIG. 2.

Turning now more particularly to FIGS. 2 and 3, the time domain signal processing section 32 may include a convolution module 40 for performing pattern recognition on the digital signals. More particularly, the convolution module may include real and imaginary input random access memories (RAMs) 41, 42 for receiving the digital signal components from the ADC 31, and respective real and imaginary multiplexers 43, 44 receiving the outputs thereof. Outputs of the multiplexers 43, 44 are input into a digital signal processor (DSP) 45, which illustratively includes a correlation section or block convolution module 46 and a sort section 47.

Target vectors corresponding to predetermined patterns may be uploaded to the correlation section 46, which may then perform pattern recognition based upon the target vectors and the digital signals using fast Fourier transform (FFT), complex multiplication, and inverse FFT (IFFT) operations, for example. A time domain matched filter implementation of the correlator 46 is illustratively shown in FIG. 3, which implements the convolution algorithm y(t)= x(t)*h(t), where x(t) represents the digital input signals and h(t) represents the target vectors. The block convolution module or correlator 46 of FIG. 3 illustratively includes a plurality of $Z^{-1}$ blocks 50a–50d, multiplication blocks 51a–51d corresponding to $h_0$ through $h_{N-1}$, and summation blocks 52a–52c. Real and imaginary output components from the sort section 47 are then written to respective real and imaginary output memories 48, 49, from which the processed digital signals may then be read.

Figure 4:
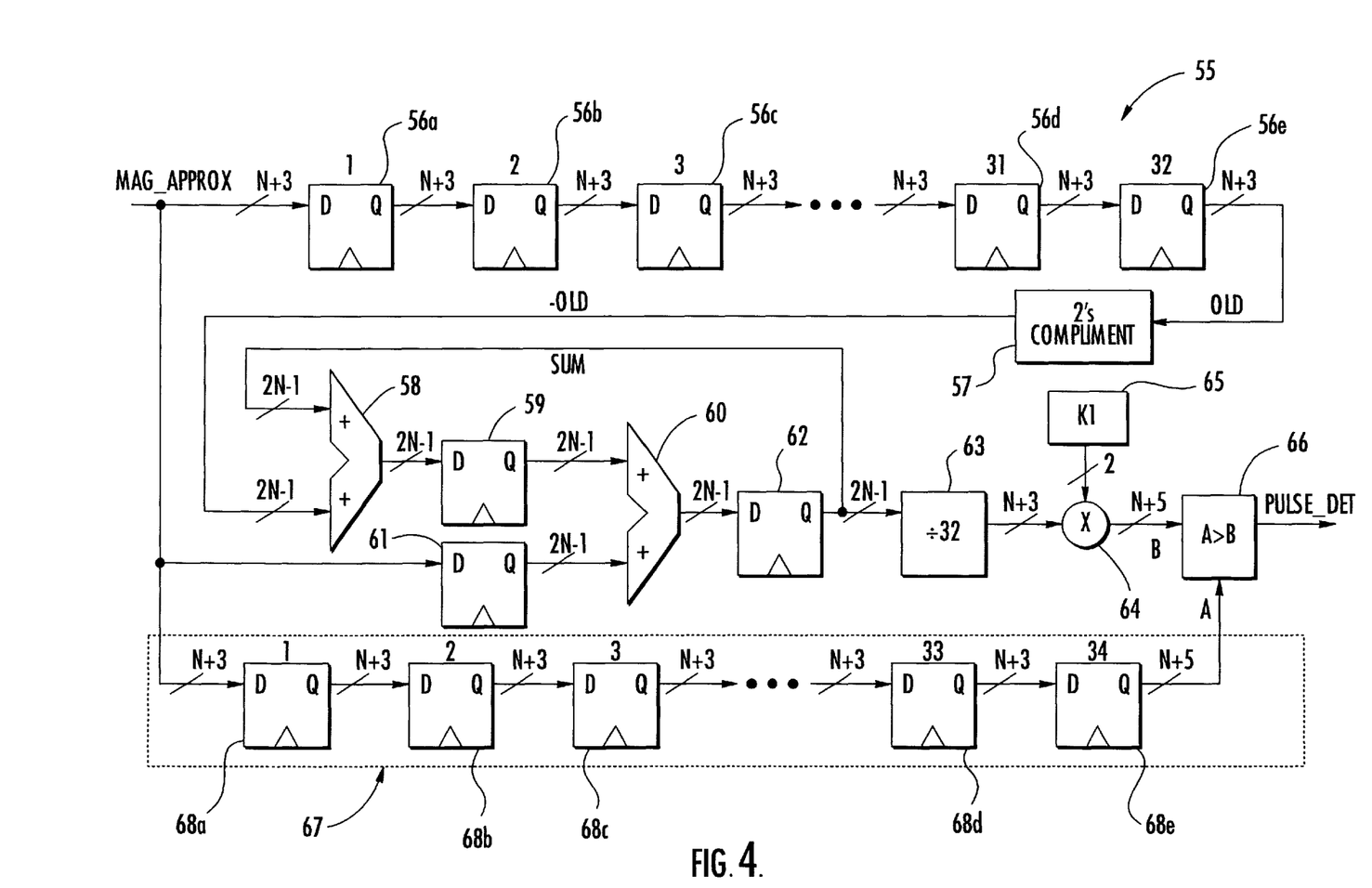
FIG. 4 is a more detailed schematic block diagram illustrating another embodiment of the time domain signal processor of FIG. 1 including a pulse threshold crossing module.

Referring now to FIG. 4, the time domain signal processor section 32 may include a pulse threshold crossing module 55 for performing waveform detection on the digital signals. Rather than receiving real and imaginary inputs as does the convolution module 40, the pulse threshold crossing module 55 is input with a magnitude of the digital signals or approximation (Mag_Approx) thereof, the calculation of which will be discussed further below with reference to FIG. 5.

The magnitude value Mag_Approx is input into a plurality of series connected D-type flip-flops 56a–56e. For example, there may be 32 of the D-type flip-flops 56, although other suitable types and numbers of devices may also be used. The output OLD from the D-type flip-flop 56e is input into a two's complement block 57, the output of which (-OLD) is received by a multiplexer 58. An output of the multiplexer 58 is input to a D-type flip-flop 59, the output of which is input into a multiplexer 60. Another input of the multiplexer 60 is provided by an output of a D-type flip-flop 61 which receives at its input the magnitude value Mag_Approx.

An output of the multiplexer 60 is provided to another D-type flip-flop 62 (or other suitable device), the output of which is fed back to the multiplexer 58 as the signal SUM and is also provided to a divide block 63 which divides this output by 32. The output of the division block 63 is multiplied by a multiplication block 64 with a two or more bit constant from a block 65, as will be appreciated by those of skill in the art, and the output of the multiplication block is provided to a comparison block 66. Another input to the comparison block 66 is provided by a delay stage 67 which includes a plurality of series-connected D-type flip-flops 68a–68e (or other suitable devices) also receiving at an input thereof the magnitude value Mag_Approx. Of course, other pulse threshold crossing detection configurations known to those of skill in the art may also be used.

Figure 5:
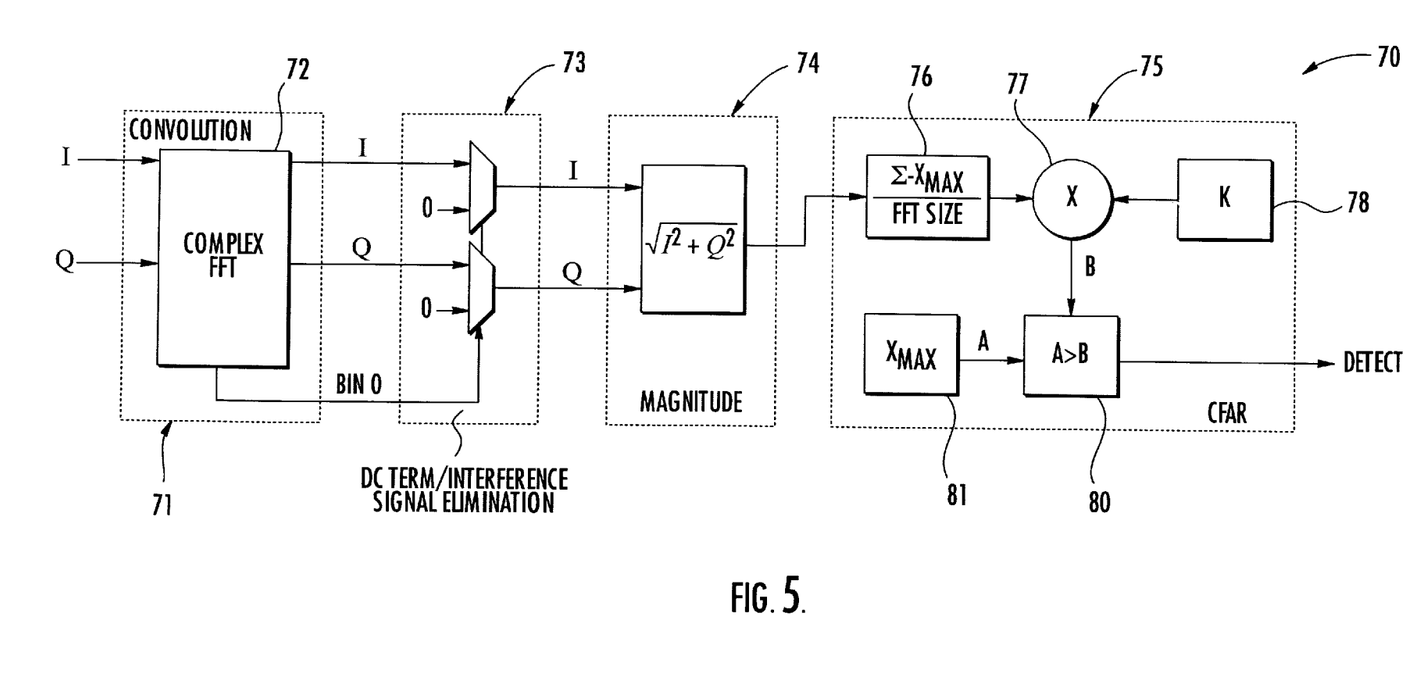
FIG. 5 is a more detailed schematic block diagram illustrating an embodiment of the frequency domain signal processor of FIG. 1 including a spectral threshold crossing module.

Turning now to FIG. 5, the frequency domain signal processing section 33 may include a spectral threshold crossing module 70 for performing waveform detection on the digital signals. The spectral threshold crossing module 70 illustratively includes a convolution module 71 including a complex FFT block 72. Yet, the convolution module 71 may perform many operations such as complex multiplication, IFFT, etc., as described above with respect to the convolution module 40. Prior to being input into the convolution module 71, the digital signals may be separated into in-phase (I) and quadrature (Q) components for processing in the frequency domain.

The convolution module 71 may be more generally used for performing pattern recognition on the digital signals, similar to the time domain convolution module 40 described above. In fact, as illustratively shown in FIG. 6, the time domain convolution module 40 and frequency domain convolution module 71 may advantageously be combined into a single convolution module 80. In the illustrated embodiment, the convolution module 80 includes real and imaginary input memories 81, 82 for receiving the time domain digital signal components from the ADC 31, as well as real and imaginary input memories 83, 84 for receiving corresponding real and imaginary frequency signal components. Further, real and imaginary multiplexers 85, 86 receive the respective outputs of the real input memories 81, 83 and the imaginary input memories 82, 84.

Figure 6:
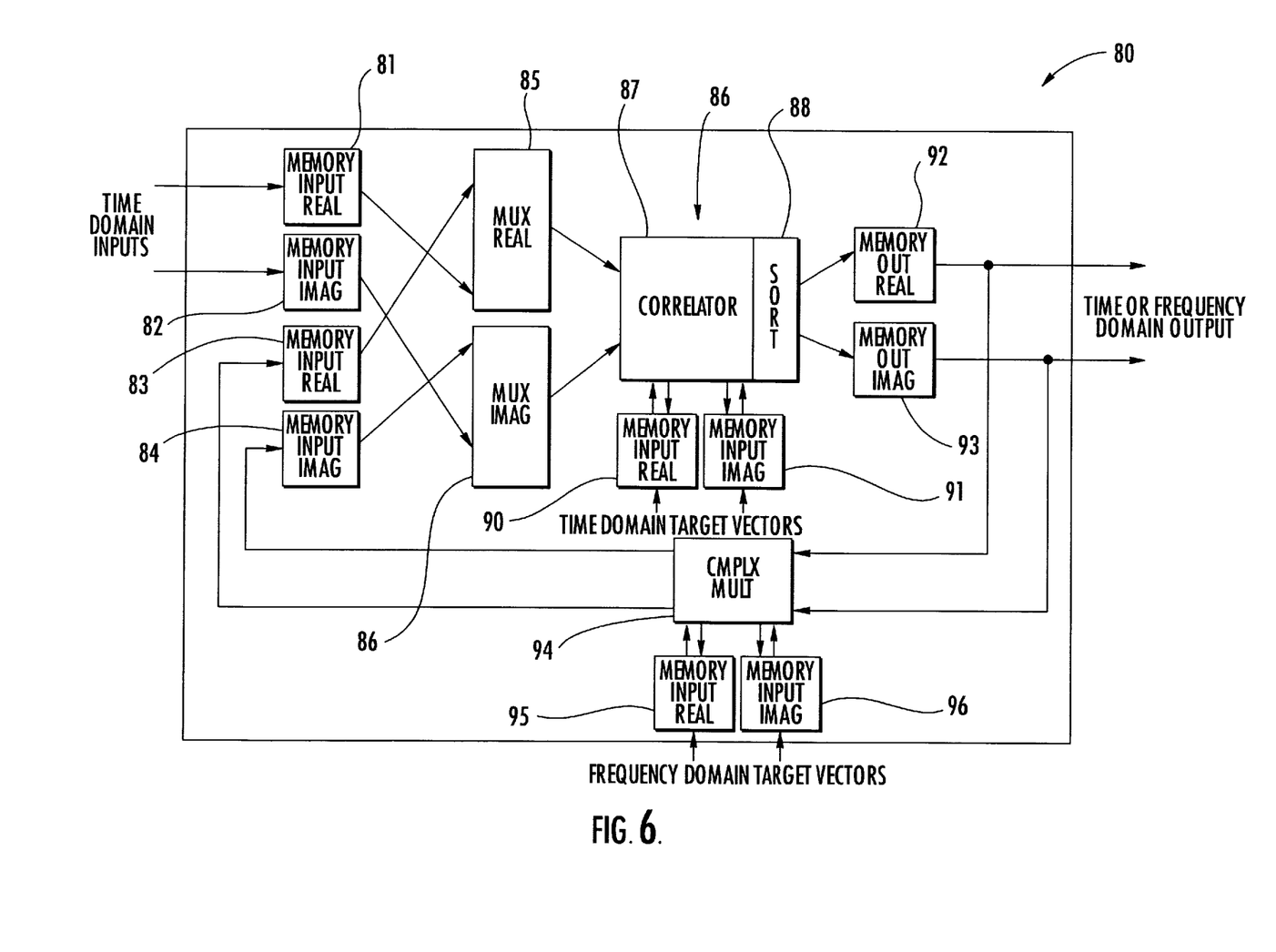
FIG. 6 is a more detailed schematic block diagram illustrating one possible implementation of the convolution module of FIG. 5 which may also be used for performing convolution in the time domain.

Outputs of the multiplexers 85, 86 are input into a DSP 86, which illustratively includes a correlation section 87 and a sort section 88. The correlation section 87 may receive time domain target vectors corresponding to predetermined patterns via real and imaginary time domain target vector memories 90, 91. Again, pattern recognition may be performed using FFT, complex multiplication, and IFFT operations, for example, as previously described above with respect to FIGS. 2 and 3. Real and imaginary output components from the sort section 88 are then written to respective real and imaginary output memories 92, 93, from which the processed digital signals may then be read.

Complex multiplication may be performed on the processed digital signals via a complex multiplication module 94, which receives frequency domain target vector signals via real and imaginary memories 95, 96. The real and imaginary outputs from the complex multiplication module 94 are input to the real and imaginary input memories 83, 84. Of course, it will be appreciated by those of skill in the art that the processing functions described herein may also be performed by a single digital processor, although these functions are described herein as separate modules and stages for clarity of explanation.

Turning once again to FIG. 5, the I and Q values output from the complex FFT block 72 are input into a DC term or interference signal elimination module 73 along with a signal Bin 0 to eliminate a DC or interference signal component from the digital signals, as will be appreciated by those of skill in the art. Next, the I and Q signal components output from the DC term or interference signal elimination module 73 are provided to a magnitude calculation module 74. As illustratively shown, the magnitude calculation module 74 includes calculation stage which calculates a magnitude A of the digital signals according to the formula:

$$A = \sqrt{I^2 + Q^2} \qquad (1)$$

While the above equation (1) does provide an exact magnitude of the incoming digital signals, in practice it may be difficult to implement this algorithm in real time because of the significant amount of processing resources required, as will be understood by those of skill in the art. Accordingly, the value of A may be estimated, for example, according to the following equation:

$$A = \text{Max}(|I|, |Q|) + \tfrac{1}{4} * \text{Min}(|I|, |Q|), \qquad (2)$$

where Max(|I|, |Q|) are maximum magnitudes of I and Q values of the digital signal and Min(|I|, |Q|) are minimum magnitudes of I and Q values of the digital signal. The equation (2) provides a fairly high degree of accuracy, and any precision which is lost may be an acceptable trade-off for the improved processing time gained in many applications. Of course, other suitable magnitude estimation methods known to those of skill in the art may also be used.

The spectral threshold crossing module 70 further includes a constant false alarm rate (CFAR) module 75 receiving the calculated magnitude value from the magnitude calculation module 74. The CFAR module 75 performs the waveform detection by determining when the magnitude value A has exceeded a threshold magnitude value B, as illustratively shown in FIG. 5. More particularly, the illustrated CFAR module 75 includes a calculation stage 76 which sums magnitude values over a given FFT size or range (i.e., N magnitude values) and subtracts a maximum amplitude value $X_{max}$ therefrom, the result of which is divided by N.

The output of the calculation stage 76 is provided to a multiplication block 77 which multiplies the output by a constant K from a block 78, the result of which is the threshold magnitude value B. The magnitude values are compared by a comparison block 80 to determine whether the maximum amplitude value $X_{max}$ (which is provided by a block 81) is greater than the threshold magnitude value B. If so, an output signal Detect is provided to indicate that the threshold magnitude value B has been exceeded.

Figure 7:
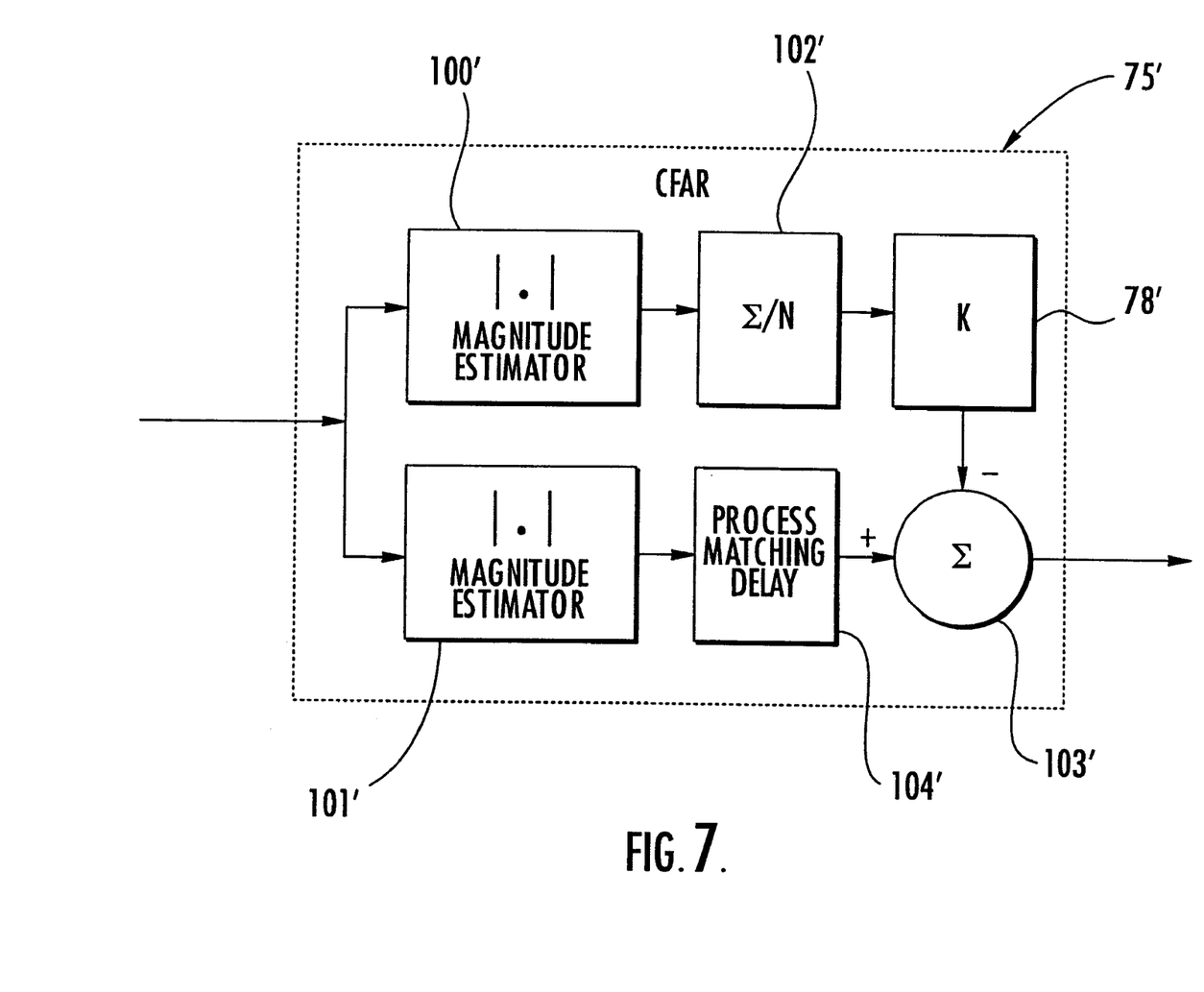
FIG. 7 is a schematic block diagram of an alternate embodiment of the constant false alarm rate (CFAR) module of FIG. 5.

An alternate CFAR module 75' is illustratively shown in FIG. 7. The CFAR module 75' may include first and second magnitude estimators 100', 101', which may calculate magnitude values as similarly described above with respect to the magnitude calculation module 74 of FIG. 5. Thus, in some embodiments, the magnitude calculation module 74 may not be required. The CFAR module 75' further includes a division block 102' for diving the sum of the magnitude values by N.

The output of the division block 102' is provided to the constant block 78', which in turn provides a negative input to an output summation block 103'. The summation block 103' receives a positive input from a process matching delay stage 104', which in turn receives as an input the output of the second magnitude estimator 101'. Of course, other suitable detection methods known to those of skill in the art may also be used, and those described herein are to be understood as exemplary embodiments provided to facilitate understanding of the present invention.

Accordingly, it will be appreciated by those of skill in the art that the multiple input-type and multiple signal processing-type device 20 provides a "universal" signal processing device which may be used in numerous applications. For example, the device 20 may advantageously be used for recognizing both moving airborne and ground vehicles, for example, which may not otherwise be possible using a single prior art device because of the lack of multiple signal processing capability. Moreover, the device 20 of the present invention may be conveniently implemented in a single unit, such as a circuit board, for example, which is not only relatively easy to transport but also relatively easy to interface with existing detectors and other equipment in the field. Additionally, the device 20 may be configured to bypass certain of the features to simply provide streamlined signal processing, such as FFT, for example.

Furthermore, numerous other applications are also possible with the device 20 according to the present invention. In addition to the applications discussed above, such as geophysical exploration, the device 20 according to the present invention may be used for processing cellular telephone signals of various formats or types, for example, to provide a universal cellular telephone device. Other applications will be readily apparent to those skilled in the art.

A method aspect of the invention is for processing multiple signals having different signal types and may include providing a multiple input-type and multiple signal processing-type device 20 as described above. The method may further include configuring the multiple input-type and multiple signal processing-type device 20 to permit a user to selectively activate one of the down-converter 26 or up-converter 27, and configuring the multiple input-type and multiple signal processing-type device to permit the user to selectively activate one of the time domain or frequency domain signal processing sections 32, 33.

Another method aspect of the invention is for processing multiple signals having different signal types and may include providing a multiple input-type and multiple signal processing-type device 20 as described above. The method may further include using a signal recognition processor 34 to perform signal recognition to determine whether to selectively activate the down-converter 26 or up-converter 27, and to determine whether to selectively activate the time domain or frequency domain signal processing sections 32, 33. The remaining aspects of the above methods may be as previously described above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A multiple input-type and multiple signal processing-type device comprising:

an input stage for receiving a plurality of different analog signal types;

a down-converter for downwardly converting first signal types to a desired processing frequency range;

an up-converter for upwardly converting second signal types to the desired processing frequency range;

an analog-to-digital converter (ADC) for converting analog signals at the desired processing frequency range into digital signals;

a time domain signal processing section connected to said ADC for performing time domain signal processing on the digital signals;

a frequency domain signal processing section connected to said ADC for performing frequency domain signal processing on the digital signals;

a user selector input for permitting a user to selectively activate one of said down-converter or up-converter, and to selectively activate one of said time domain or frequency domain signal processing sections; and a signal recognition processor for performing signal recognition to determine whether to selectively activate said down-converter or up-converter, and to determine whether to selectively activate said time domain or frequency domain signal processing sections.

2. The multiple input-type and multiple signal processing-type device of claim 1 wherein said time domain signal processing section comprises a convolution module for performing pattern recognition on the digital signals.

3. The multiple input-type and multiple signal processing-type device of claim 1 wherein said time domain signal processing section comprises a pulse threshold crossing module for performing waveform detection on the digital signals.

4. The multiple input-type and multiple signal processing-type device of claim 1 wherein said frequency domain signal processing section comprises a convolution module for performing pattern recognition on the digital signals.

5. The multiple input-type and multiple signal processing-type device of claim 1 wherein said frequency domain signal processing section comprises a spectral threshold crossing module for performing waveform detection on the digital signals.

6. The multiple input-type and multiple signal processing-type device of claim 5 wherein said spectral threshold crossing module comprises a constant false alarm rate (CFAR) module.

7. The multiple input-type and multiple signal processing-type device of claim 6 wherein said spectral threshold crossing module further comprises:

a magnitude calculation module upstream from said CFAR module; and a DC term elimination module upstream from said magnitude calculation module.

8. The multiple input-type and multiple signal processing-type device of claim 5 wherein said spectral threshold crossing module comprises at least one of a fast Fourier transform (FFT) module and an inverse FFT (IFFT) module.

9. The multiple input-type and multiple signal processing-type device of claim 1 further comprising at least one filter coupling the analog signals at the desired processing frequency to said ADC.

10. The multiple input-type and multiple signal processing-type device of claim 1 wherein the plurality of different analog signal types comprise at least two of optical signals, radio frequency (RF) signals, seismic signals, and acoustic signals.

11. A multiple input-type and multiple signal processing-type device comprising:

an input stage for receiving a plurality of different signal types;

a down-converter for downwardly converting first signal types to a desired processing frequency range;

an up-converter for upwardly converting second signal types to the desired processing frequency range;

an analog-to-digital converter (ADC) for converting analog signals at the desired processing frequency range into digital signals;

a time domain signal processing section connected to said ADC for performing time domain signal processing on the digital signals;

a frequency domain signal processing section connected to said ADC for performing frequency domain signal processing on the digital signals; and a user selector input for permitting a user to selectively activate one of said down-converter or up-converter, and to selectively activate one of said time domain or frequency domain signal processing sections.

12. The multiple input-type and multiple signal processing-type device of claim 11 wherein said time domain signal processing section comprises a convolution module for performing pattern recognition on the digital signals.

13. The multiple input-type and multiple signal processing-type device of claim 11 wherein said time domain signal processing section comprises a pulse threshold crossing module for performing waveform detection on the digital signals.

14. The multiple input-type and multiple signal processing-type device of claim 11 wherein said frequency domain signal processing section comprises a convolution module for performing pattern recognition on the digital signals.

15. The multiple input-type and multiple signal processing-type device of claim 11 wherein said frequency domain signal processing section comprises a spectral threshold crossing module for performing waveform detection on the digital signals.

16. The multiple input-type and multiple signal processing-type device of claim 15 wherein said spectral threshold crossing module comprises a constant false alarm rate (CFAR) module.

17. The multiple input-type and multiple signal processing-type device of claim 16 wherein said spectral threshold crossing module further comprises:

a magnitude calculation module upstream from said CFAR module; and an interference signal elimination module upstream from said magnitude calculation module.

18. The multiple input-type and multiple signal processing-type device of claim 15 wherein said spectral threshold crossing module comprises at least one of a fast Fourier transform (FFT) module and an inverse FFT (IFFT) module.

19. The multiple input-type and multiple signal processing-type device of claim 11 further comprising at least one filter coupling the analog signals at the desired processing frequency to said ADC.

20. The multiple input-type and multiple signal processing-type device of claim 11 wherein the plurality of different analog signal types comprise at least two of optical signals, radio frequency (RF) signals, seismic signals, and acoustic signals.

21. A multiple input-type and multiple signal processing-type device comprising:

an input stage for receiving a plurality of different analog signal types;

a down-converter for downwardly converting first signal types to a desired processing frequency range;

an up-converter for upwardly converting second signal types to the desired processing frequency range;

an analog-to-digital converter (ADC) for converting analog signals at the desired processing frequency range into digital signals;

a time domain signal processing section connected to said ADC for performing time domain signal processing on the digital signals;

a frequency domain signal processing section connected to said ADC for performing frequency domain signal processing on the digital signals; and a signal recognition processor for performing signal recognition to determine whether to selectively activate said down-converter or up-converter, and to determine whether to selectively activate said time domain or frequency domain signal processing sections.

22. The multiple input-type and multiple signal processing-type device of claim 21 wherein said time domain signal processing section comprises a convolution module for performing pattern recognition on the digital signals.

23. The multiple input-type and multiple signal processing-type device of claim 21 wherein said time domain signal processing section comprises a pulse threshold crossing module for performing waveform detection on the digital signals.

24. The multiple input-type and multiple signal processing-type device of claim 21 wherein said frequency domain signal processing section comprises a convolution module for performing pattern recognition on the digital signals.

25. The multiple input-type and multiple signal processing-type device of claim 21 wherein said frequency domain signal processing section comprises a spectral threshold crossing module for performing waveform detection on the digital signals.

26. The multiple input-type and multiple signal processing-type device of claim 25 wherein said spectral threshold crossing module comprises a constant false alarm rate (CFAR) module.

27. The multiple input-type and multiple signal processing-type device of claim 26 wherein said spectral threshold crossing module further comprises:

a magnitude calculation module upstream from said CFAR module; and a DC term elimination module upstream from said magnitude calculation module.

28. The multiple input-type and multiple signal processing-type device of claim 25 wherein said spectral threshold crossing module comprises at least one of a fast Fourier transform (FFT) module and an inverse FFT (IFFT) module.

29. The multiple input-type and multiple signal processing-type device of claim 21 further comprising at least one filter coupling the analog signals at the desired processing frequency to said ADC.

30. The multiple input-type and multiple signal processing-type device of claim 21 wherein the plurality of different analog signal types comprise at least two of optical signals, radio frequency (RF) signals, seismic signals, and acoustic signals.

31. A method for processing multiple signals having different signal types, the method comprising:

providing a multiple input-type and multiple signal processing-type device comprising an input stage for receiving a plurality of different signal types, a down-converter for downwardly converting first signal types to a desired processing frequency range, an up-converter for upwardly converting second signal types to the desired processing frequency range, an analog-to-digital converter (ADC) for converting analog signals at the desired processing frequency range into digital signals, a time domain signal processing section connected to the ADC for performing time domain signal processing on the digital signals, and a frequency domain signal processing section connected to the ADC for performing frequency domain signal processing on the digital signals;

configuring the multiple input-type and multiple signal processing-type device to permit a user to selectively activate one of the down-converter or up-converter; and configuring the multiple input-type and multiple signal processing-type device to permit the user to selectively activate one of the time domain or frequency domain signal processing sections.

32. The method of claim 31 wherein the time domain signal processing section comprises a convolution module for performing pattern recognition on the digital signals.

33. The method of claim 31 wherein the time domain signal processing section comprises a pulse threshold crossing module for performing waveform detection on the digital signals.

34. The method of claim 31 wherein the frequency domain signal processing section comprises a convolution module for performing pattern recognition on the digital signals.

35. The method of claim 31 wherein the frequency domain signal processing section comprises a spectral threshold crossing module for performing waveform detection on the digital signals.

36. A method for processing multiple signals having different signal types, the method comprising:

receiving a plurality of different signal types;

downwardly converting first signal types to a desired processing frequency range using a down-converter;

upwardly converting second signal types to the desired processing frequency range using an up-converter;

converting analog signals at the desired processing frequency range into digital signals;

performing time domain signal processing on the digital signals using a time domain processor and performing frequency domain signal processing on the digital signals using a frequency domain processor; and performing signal recognition to determine whether to selectively activate the down-converter or up-converter, and to determine whether to selectively activate the time domain or frequency domain signal processors.

37. The method of claim 36 wherein performing time domain signal processing comprises performing pattern recognition on the digital signals.

38. The method of claim 36 wherein performing time domain signal processing comprises performing waveform detection on the digital signals.

39. The method of claim 36 wherein performing frequency domain signal processing comprises performing pattern recognition on the digital signals.

40. The method of claim 36 wherein performing frequency domain signal processing comprises performing waveform detection on the digital signals.

* * * * *